United States Patent
Fuglerud et al.

(10) Patent No.: US 7,341,707 B2
(45) Date of Patent: Mar. 11, 2008

(54) METHOD FOR IN-SITU SYNTHESIS OF CRYSTALLINE MICROPOROUS METALLOALUMINOPHOSPHATE IN A FORMED BODY

(75) Inventors: Terje Fuglerud, Porsgrunn (NO); Arne Gidløv Grønvold, Porsgrunn (NO); Rune Wendelbo, Oslo (NO); Åse Slagtern, Oslo (NO); Ivar Martin Dahl, Oslo (NO)

(73) Assignee: Polymers Holding AS, Oslo (NO)

( * ) Notice: Subject to any disclaimer, the term of this patent is extended or adjusted under 35 U.S.C. 154(b) by 194 days.

(21) Appl. No.: 10/515,502

(22) PCT Filed: May 23, 2003

(86) PCT No.: PCT/NO03/00170

§ 371 (c)(1),
(2), (4) Date: Feb. 2, 2005

(87) PCT Pub. No.: WO03/101892

PCT Pub. Date: Dec. 11, 2003

(65) Prior Publication Data

US 2005/0171394 A1    Aug. 4, 2005

(30) Foreign Application Priority Data

May 31, 2002 (NO) .................................. 20022608

(51) Int. Cl.
*C01B 37/06* (2006.01)
*C01B 37/08* (2006.01)
*C01B 39/04* (2006.01)
*C01B 39/54* (2006.01)
*B01J 29/84* (2006.01)
*B01J 29/85* (2006.01)
*C07C 1/20* (2006.01)

(52) U.S. Cl. ...................... 423/702; 423/705; 423/706; 423/707; 423/712; 423/716; 423/305; 423/306; 502/60; 502/62; 502/208; 502/214; 585/638; 585/640

(58) Field of Classification Search ................ 423/712, 423/716, 305, 306, 702, 705, 706, 707, DIG. 30; 502/208, 214, 60, 62; 585/638, 640
See application file for complete search history.

(56) References Cited

U.S. PATENT DOCUMENTS

| 4,861,743 A | 8/1989 | Flank et al. |
| 4,973,785 A | 11/1990 | Lok et al. |
| 5,514,362 A | 5/1996 | Miller |
| 6,004,527 A * | 12/1999 | Murrell et al. ............... 423/712 |
| 6,207,872 B1 | 3/2001 | Barger et al. |

FOREIGN PATENT DOCUMENTS

WO         03040037         5/2003

* cited by examiner

*Primary Examiner*—David M Brunsman
(74) *Attorney, Agent, or Firm*—Wenderoth, Lind & Ponack, L.L.P.

(57) ABSTRACT

The invention concerns a method for production of microporous crystalline metalloaluminium phosphates (ELAPO) based adsorbents or catalysts by in-situ crystallisation of ELAPO inside a formed body. First the formed body containing aluminium phosphate (AlPO) and binder is prepared, thereafter the organic structure directing agent, EL source and water are added and finally ELAPO is crystallised in-situ at elevated temperature and pressure, while keeping the shape and size of the formed body.

39 Claims, 7 Drawing Sheets

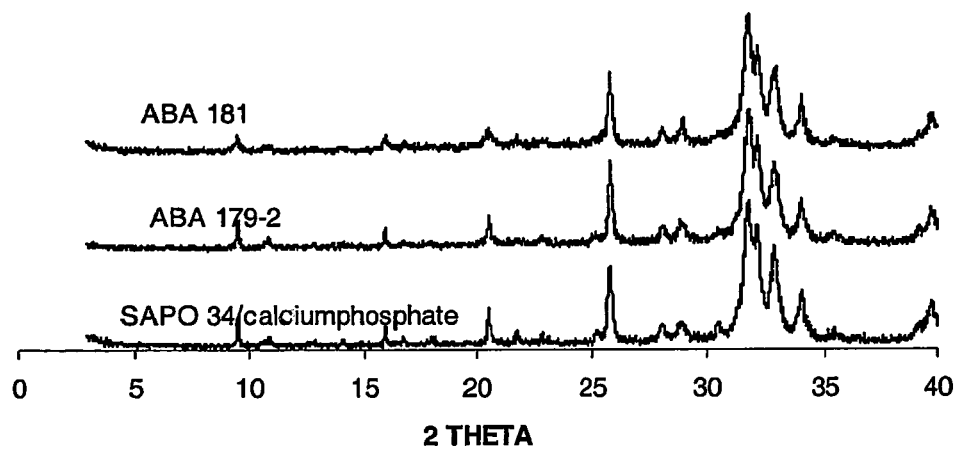
Figure 1  XRD diffractograms of formed bodies after SAPO-34 synthesis (ABA-181; Example 10 and ABA-179-2; Example 1) compared with standard SAPO-34 mixed with calciumphosphate

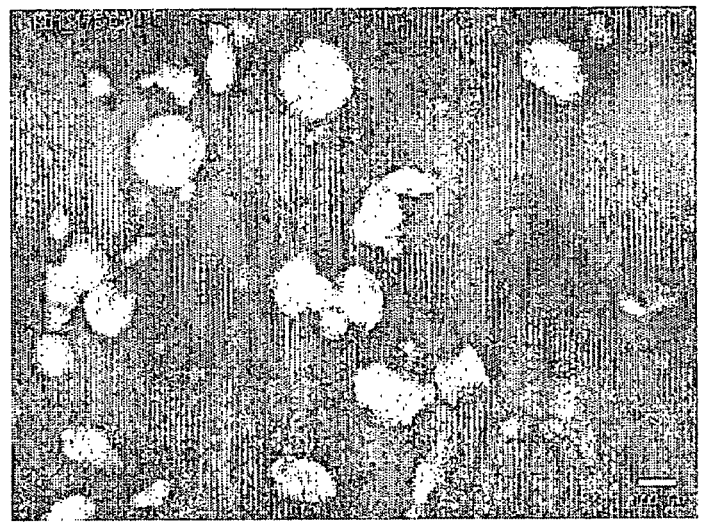
a)
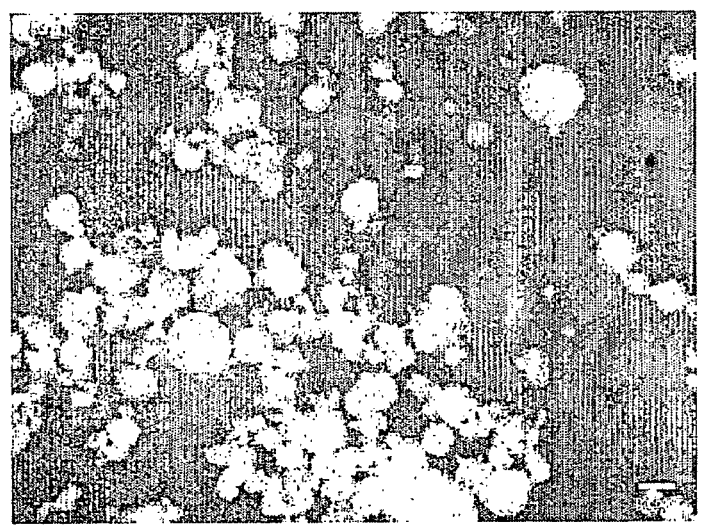
b)
Figure 2     Microscopy of formed bodies (Example 1) (K01-178.001) a) before and b) after SAPO-34 synthesis (ABA-179-2).

Figure 3 SEM pictures of formed bodies before and after exposure to SAPO-34 synthesis conditions (Example 17)
K01-179.001 before synthesis
ABA-194 after synthesis
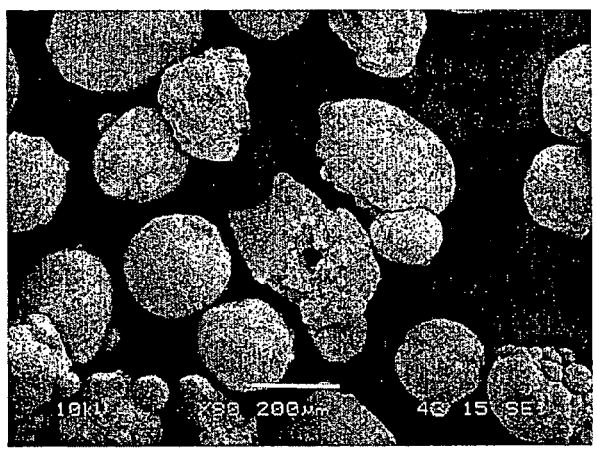
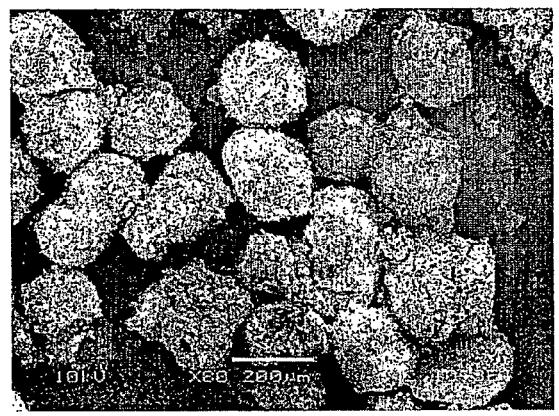
ABA-194 after synthesis
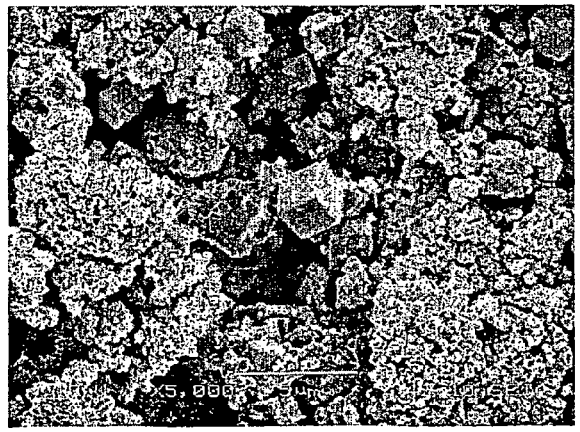

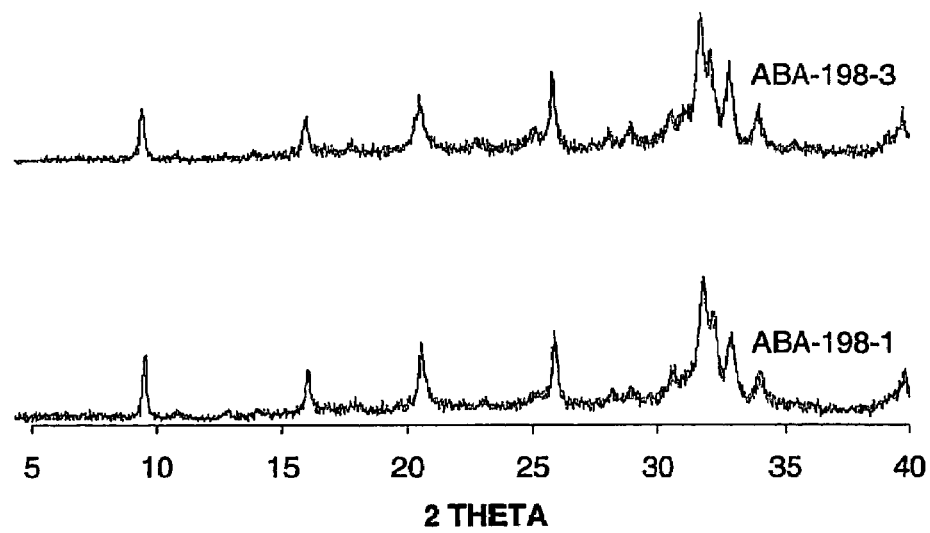
Figure 4  XRD of in-situ synthesis of SAPO-34 in formed bodies (spray dried). The samples were not washed after crystallisation (Examples 20 and 21).

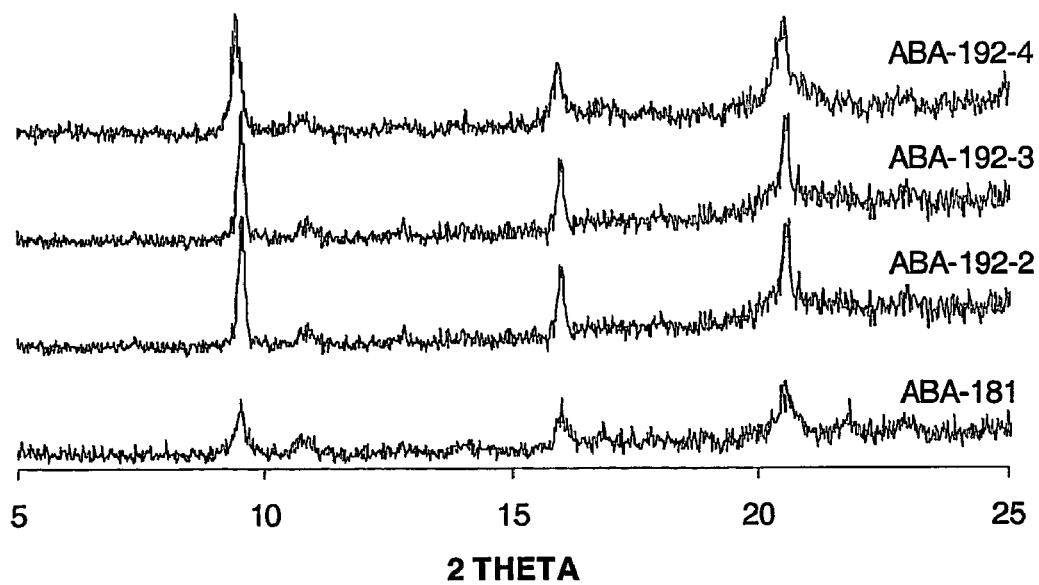
Figure 5   XRD diffractograms of formed bodies after SAPO-34 synthesis (ABA-192-2 (Example 22), ABA-192-3 (Example 23), ABA-192-4 (Example 24) and ABA-181 (Example 25)

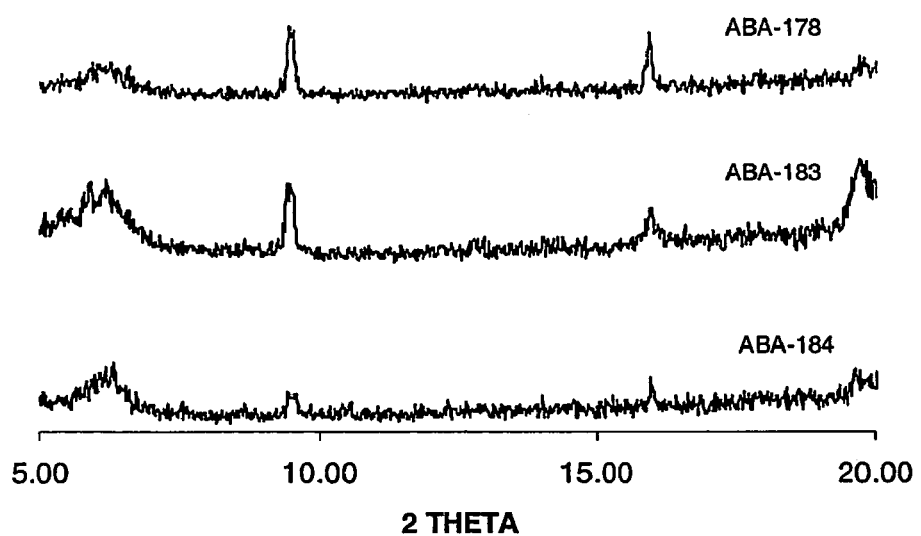
Figure 6  XRD of tablets of alternative binders and AlPO exposed to SAPO-34 synthesis (ABA-178; Example 26 kaoline as binder, ABA-183; Example 27 ☐-$Al_2O_3$ as binder, ABA-184; Example 28 $Al_2O_3$-sol as binder)

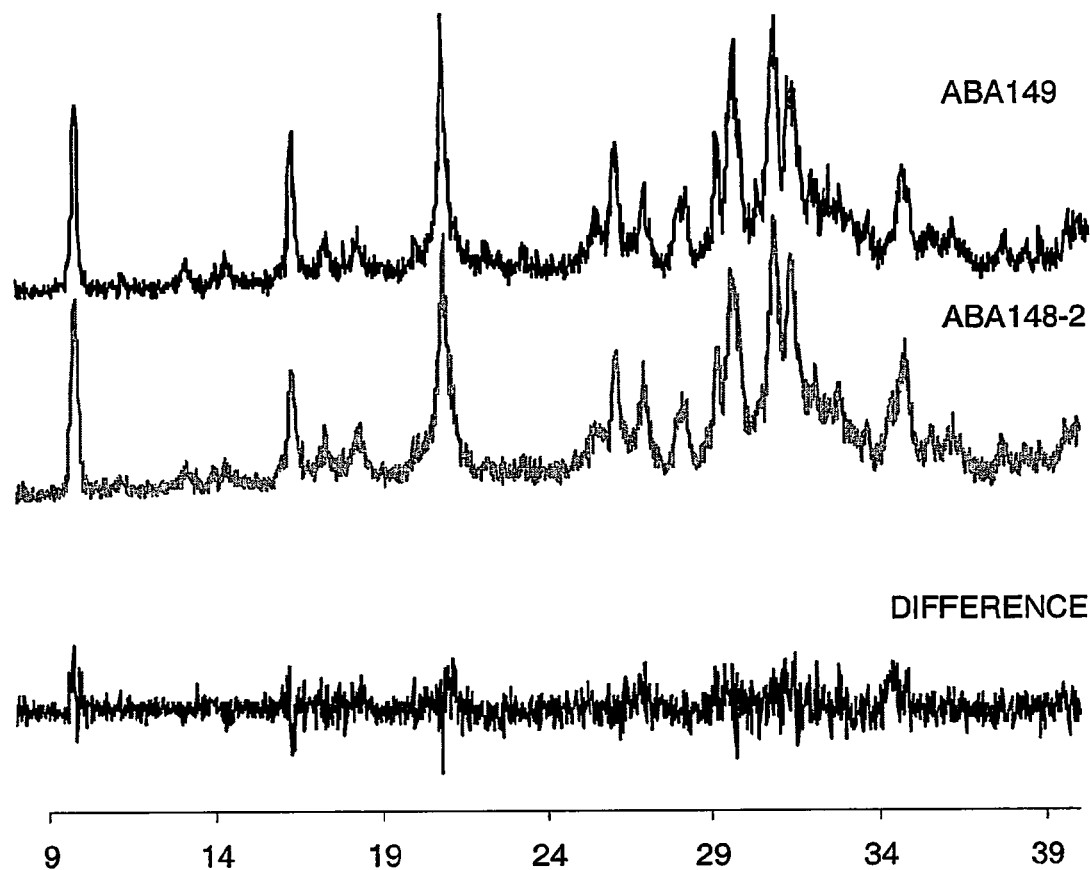
Figure 7 XRD patterns of samples ABA149 (Example 29) and BA148-2 (reference)

METHOD FOR IN-SITU SYNTHESIS OF CRYSTALLINE MICROPOROUS METALLOALUMINOPHOSPHATE IN A FORMED BODY

This application is a 371 filing of PCT/NO03/00170, filed 23 May 2003.

The present invention concerns a simplified method of preparing formed bodies containing crystalline metalloaluminophosphates (ELAPO), and more particularly crystalline microporous silicoaluminophosphates (SAPO) of the molecular sieve type. First a formed body is prepared from aluminium phosphate (AlPO), binder and possibly an EL source. Thereafter ELAPO is crystallised from parts of the formed body in such a manner that the crystallisation takes place inside the formed body. The presence of the binder in the formed body enables the preservation of the shape and size of the formed body. The formed body has the shape the final product needs for its applications, exemplified by, but not limited to: tubes, cylinders, spheres, sheets. The invention also concerns use of this product as a catalyst for methanol to olefin (MTO) production.

ELAPOs are molecular sieves that have a three-dimensional microporous framework structure of tetrahedral units from $AlO_2$, $PO_2$ and $ELO_2$. Generally the ELAPOs have a chemical composition on an anhydrous basis expressed by the empirical formula of:

$$H_w(El_xAl_yP_z)O_2$$

where EL is a metal exemplified but not limited to silicon, magnesium, zinc, iron, cobalt, nickel, manganese, chromium, titanium and mixtures thereof, "x" is the mole fraction of EL and has a value from 0.001 to 0.3, "y" is the mole fraction of Al and has a value of at least 0.01, "z" is the mole fraction of P and has a value of at least 0.01, x+y+z=1 and w is the mole fraction of H and has a value between 0 and 0.3. The ELAPOs constitute a generic class of non-zeolite molecular sieve materials being capable of undergoing complete and reversible dehydration while retaining the same essential framework topology in both the anhydrous and hydrated state.

One such ELAPO is the silicoaluminiumphosphate, SAPO-34, which is the catalyst of choice for the MTO-reaction. It has chabasite (CHA) structure and is usually synthesised from an alumina source, a silica source, a phosporous source and at least one organic structure directing agent. This structure directing agent is usually tetraethyl ammonium hydroxide (TEAOH). An aqueous dispersion of the gel resulting from mixing the components above is hydrothermally digested at a temperature from 100-260° C. under autogenous pressure to crystallise the SAPO-34. The structure directing agent is usually removed by heating in an oxygen-containing atmosphere (500-700° C.). The calcined material contains acidic protons and has catalytic properties.

If small amounts of Si are used during the synthesis with TEAOH as a structure directing agent, one can obtain structures with the AEI structure. SAPO-5 (AFI-structure) can also crystallise from such gels. These structures are defined in Atlas of Zeolite Structure Types, W. M. Meier and D. H. Olson, Second Revised Edition 1987, by Butterworths.

U.S. Pat. No. 4,861,743 teaches a process for the production of a crystalline non-zeolitic molecular sieve in a preformed body or carrier. By contacting a liquid reaction mixture with spraydried particles or extrudates of alumina or silica-alumina at hydrothermal conditions the crystalline non-zeolitic molecular sieve is produced. The liquid reaction mixture contains a reactive source of phosphorous pentoxide and an organic structure directing agent. The crystallisation takes place at elevated pressure and temperature and the preformed body reacts with the liquid mixture to form non-zeolitic molecular sieves within the body. Phosphorous can be an active component in the liquid or on the solid alumina or silica-alumina. Likewise, if the non-zeolitic molecular sieve contains silica, the reactive source of silica can be included in the body and/or in the liquid reaction mixture. If the non-zeolitic molecular sieve is to contain one or more elements other than aluminium, silicon and phosphorus, the reactive sources of these elements may be included in the silica or silica-alumina body and/or in the liquid reaction mixture. Thus, only alumina or silica-alumina is used as the preformed body and all other reactive components are either impregnated on the body or in the liquid mixture. In the preparation method that is described, the smallest amount of water used is 25 moles of water per mole of phosphorous. Thus, excess liquid is used and needs to be removed after synthesis.

U.S. Pat. No. 5,514,362 teaches synthesis of SAPO-5, SAPO-11, SAPO-31 and SAPO-39 from dense mixtures of alumina and silica gel, with no excess liquid to be removed. The dense gel can be formed into self-supporting particles and the shape of the particles is preserved after crystallisation. The gel comprises alumina, silica, structure directing agent and an active source of phosphorous. In all examples the dense gel is extruded into particles before the crystallisation process takes place. The molecular sieve crystallites formed are smaller than those generally formed in conventional processes.

European patent application 1002764 describes a method for the preparation of small zeolite crystals inside a porous support material with pores smaller than 1000 Å. In this way the size of the zeolite crystals can be controlled. The porous support material is preferably removable in order to isolate the pure zeolite or it is useful as a component of a desired catalyst. Typical support materials are carbon or magnesium oxide representing the group of removable porous support materials and silica alumina, which may be a desirable constituent of the catalyst. To obtain the product, the support material is impregnated with a synthesis gel consisting essentially of a zeolite precursor composition comprising hydrated oxides of Si, Al and P, metal compounds and a zeolite structure directing agent. The advantages of the method are to prepare small crystallites and that the porous support material is used to control the crystallite size. The porous support material is not an active source of the crystallised zeolite.

U.S. Pat. No. 6,004,527 relates to a "dry" process for the production of a large pore molecular sieve by impregnating a solid metal oxide-framework-structure with other reagents without forming a paste and without destroying the structure of the cation-oxide framework. The impregnation is suitable for a paste-free hydrothermal reaction between the other reagents and the solid metal oxide-framework-structure. Then the impregnated paste-free composition is subjected to conditions of elevated temperature and pressure to effect a hydrothermal reaction and convert the reagents of the reaction into a crystalline molecular sieve that possesses the morphologic characteristics of the solid cation oxide-framework-structure. The production of zeolite particles from silica is exemplified.

One object of the present invention is to develop a cheap, simple and environmentally friendly production method for formed bodies containing the metalloaluminophosphate type (ELAPO). Of special interest are bodies containing silicoaluminophosphate (SAPO).

Another object of the present invention is to produce formed bodies containing the metalloaluminophosphate type (ELAPO) for use as catalysts or absorbents. Of special interest is preparation of catalysts, which contain SAPO-34 crystallites with suitable size and composition for methanol to olefin production.

BRIEF DESCRIPTION OF THE DRAWINGS

These objects of the invention are obtained with the method as described below.

The invention is further defined and characterised by the enclosed patent claims.

The invention will be further documented with reference to FIGS. 1-7, where:

FIG. 1 shows XRD diffractograms of reference SAPO-34 mixed with calcium phosphate and of the products of Examples 1 and 10.

FIG. 2 shows microscopy of formed bodies of Example 1.

FIG. 3 shows SEM pictures of Example 17.

FIG. 4 shows XRD diffractograms of Examples 20-21.

FIG. 5 shows XRD diffractograms of Examples 22-25.

FIG. 6 shows XRD diffractograms of Examples 26-28.

FIG. 7 shows XRD diffractograms of reference SAPO-34 and Example 29.

The invention thus concerns a method for preparation of crystalline microporous metalloaluminophosphate (ELAPO) in a formed body. The formed body is made from an inert binder and a solid material containing Al, P and optionally EL. An inert binder is a material being inert at the conditions prevailing in the crystallisation of ELAPO and that aids in the formation of the body. The material is also inert, or has no adverse effects in the final application of the product. After adding to the formed body a liquid reaction mixture, comprising an active source of the EL metal, an organic structure directing agent and water, the crystallisation is performed inside the formed body at elevated temperature under autogenous pressure to form crystals of microporous ELAPO.

The EL metal is selected from the group consisting of silicon, magnesium, zinc, iron, cobalt, nickel, manganese, chromium, titanium and mixtures thereof. The EL metal may be pre-reacted with the organic structure directing agent solution, or EL may also be part of the formed body as a physical mixture, or as an EL aluminium phosphate.

It is preferred to use silicon as the EL metal and produce crystalline microporous SAPO. The use of the inert binder in the formed body enables the shape and the size of the formed body to be intact after the crystallisation. The AlPO part of the formed body is converted to SAPO and located inside the formed body. The hydrothermal reaction time is typically 1-120 hours, preferably 2-20 hours. The crystallisation should be performed at temperatures from 100-260° C., preferably 200-220° C.

The organic structure directing agent may be selected from tetraethyl ammonium hydroxide (TEAOH), triethylamine (TEA), isopropylamine (IPA), di-isopropylamine (DPA), tripropylamine (TPA), cyclohexylamine or tetramethyl-ammonium-hydroxide (TMAOH). After crystallisation the formed body is calcined in air in order to remove the organic structure directing agent to obtain the final product.

The product could be used as adsorbent or as catalyst. One example to be mentioned is the use of the product as catalyst for the conversion of methanol to light olefins. The product could also be used as catalysts for the production of olefins from an oxygenate containing feedstock comprising at least one compound selected from the group consisting of methanol, ethanol, n-propanol, iso-propanol, C4-C20 alcohols, methyl ethyl ether, dimethyl ether, diethyl ether, di-isopropyl ether, formaldehyde, dimethyl carbonate, dimethyl ketone, acetic acid and mixtures thereof.

In contrast to prior art preparation methods, crystallisation of ELAPO or SAPO is performed in-situ in formed bodies containing a binder. The body has aluminium phosphate as the active source for both aluminium and phosphorous. After in-situ crystallisation of ELAPO the formed body maintains its size and shape and can be used for its applications after calcination.

For in-situ crystallisation of SAPOs in the formed body, silica sol or fumed silica are preferred active sources of silicon. Silica gel and silica hydrogel, silicates, silicic acid, colloidal silica, silica hydroxides, alkoxides of silicon, and reactive solid amorphous precipitated silica are also suitable. The silica may be prereacted with the organic structure directing agent solution, or silica may be a part of the formed body as a physical mixture, or as a silico aluminium phosphate.

An organic structure directing agent is added to facilitate crystallisation of the desired molecular sieve. Suitable organic structure directing agents include tetraethyl ammonium hydroxide (TEAOH), triethylamine (TEA), isopropylamine (IPA), diisopropylamine (DPA), tripropylamine (TPA), cyclohexylamine and tetramethyl-ammonium-hydroxide (TMAOH) or mixtures thereof.

For the preparation of SAPOs in a formed body, the formed body is mixed with water, if necessary a silicon source, and a liquid phase containing an organic structure directing agent. The reaction mixture is placed in a sealed pressure vessel, preferably lined with an inert plastic material such as polytetrafluorethylene. The reaction mixture is heated under autogenous pressure at a temperature in the range of 100° C. to 260° C., preferably at a temperature of 200-220° C. for a period of from one hour to some days, typically 2-120 hours, preferably about 4-20 hours. Under these conditions, one or more SAPOs (e.g. SAPO-34/SAPO-18/SAPO-5) are crystallised in-situ in the formed body without any change in the shape or the size of the formed body. The product is calcined at 500-600° C. for a few hours in dry air in order to remove the organic structure directing agent from the pores of the crystalline molecular sieve part of the product. The calcined product can be directly used for its applications.

Prior art preparation of bodies containing crystalline ELAPO concerns first crystallisation of ELAPO and thereafter forming the solid body. Using this prior art procedure, the following disadvantages occur:

Some ELAPO is lost during the washing procedure after crystallisation.

ELAPO can be irreversible damaged during the procedure of forming the bodies.

Loss of ELAPO during the procedure of forming the bodies.

The present synthesis method, where the crystallisation takes place after the forming of the body, has the following advantages compared to prior art:

The formulation of the catalyst/adsorbent body is simpler because the porous AlPO is less sensitive compared to crystalline ELAPO, and does not undergo irreversible damages during the procedure for making the formed body.

The most expensive step (crystallisation of ELAPO) is performed as the last step with high yield. Any off-grade materials can be removed in steps prior to the crystallisation procedure and there will be no loss of ELAPO crystallites in post-treatment steps.

The formed body before crystallisation is relatively inexpensive and can be stored onsite and crystallisation can be performed as required.

There is no washing step needed after the ELAPO synthesis and no costly treatment of excess fluids from the reaction.

EXAMPLES

The invention will be further illustrated by the examples to follow. If not otherwise stated in the text, a Teflon lined steel autoclave of volume 40 ml, a synthesis temperature of 210° C. and a synthesis time of 20 hours were used. The following reagents were used for the ELAPO synthesis:

Silica source: Ludox LS-30; 30 weight % suspension in water (pH=8.2), from Du Pont.

Organic structure directing agent: TEAOH (tetraethyl ammonium hydroxide; Aldrich; 35 weight %) aqueous solution.

AlPO: synthesised according to the method given in U.S. Pat. No. 4,364,855, P/Al=0.8 mol/mol and calcined at 400° C.

Two types of formed bodies were used, prepared by spray drying or prepared by extrusion.

XRD Analysis

The products were analysed using a Siemens D-5000 X-ray powder diffractometer, which produces monochromatic radiation (from a $CuK_{\alpha 1}$ source) of wavelength equal to 1.54 Å. Most of the XRD patterns presented in this invention are displayed along with the XRD pattern of a reference SAPO-34 obtained by a conventional wet synthesis procedure essentially like that in U.S. Pat. No. 4,440,871 (B. M. Lok et al., Example 35). The diffraction pattern of this latter reference sample is denoted ABA-132 in the Figures.

XRF Analysis

Chemical composition was analyzed using a Philips PW 2400 instrument.

Examples 1-16

In-situ Synthesis of SAPO-34 from Formed Bodies

Four different compositions of formed bodies were prepared by spray drying from mixtures of AlPO, Ca-phosphate ($Ca_{10}(PO_4)_6(OH)_2$) (inert binder) (Aldrich 23,093-6) and $SiO_2$ (DuPont Ludox HS-40). The chemical composition of the formed bodies calculated from XRF analysis are given in Table 1.

TABLE 1

Chemical composition of the formed bodies (spraydried materials) prepared from AlPO, Ca-phosphate and $SiO_2$

| Formed body | AlPO (wt %) | $Ca_{10}(PO_4)_6(OH)_2$ (wt %) | $SiO_2$ (wt %) |
|---|---|---|---|
| K01-178.001 | 15 | 83 | 2 |
| K01-179.001 | 28 | 70 | 1 |
| K01-180.001 | 25 | 54 | 21 |
| K01-181.001 | 24 | 62 | 14 |

The formed bodies were calcined at various temperatures. Thereafter SAPO-34 synthesis was performed on the formed bodies as follows:

A synthesis mixture was prepared by adding Ludox LS-30 to the formed bodies. For the formed bodies containing >10% $SiO_2$, Ludox was not added. Then TEAOH and water was added. The resulting mixture was reacted in the autoclave at 210° C. for 20 h. All syntheses according to this recipe are compiled in Table 2. All the samples were characterised as synthesised with XRD. The XRD analyses confirmed in-situ synthesis of SAPO-34 in the formed bodies. This is exemplified in FIG. 1 showing diffractograms of reference SAPO-34 (ABA-132) mixed with calcium phosphate and of the synthesis products obtained in Example 1 (ABA-179-2) and Example 10 (ABA-181). In Table 2 it is stated whether SAPO-34 was observed by XRD after synthesis or not.

Microscopy of the formed bodies before and after SAPO-34 synthesis showed that the shape and size of the formed bodies were preserved during the synthesis (FIG. 2).

These examples show that SAPO-34 was successfully prepared in-situ in the formed bodies. In addition, the Examples 10-16 show that when Si is part of the formed body, addition of Ludox is not necessary for obtaining SAPO-34.

Example 17

In-situ Synthesis of SAPO-34 from Fractionated Formed Bodies

SAPO-34 synthesis was performed on the formed body K01-179.001 (spraydried material, Table 1). A sieved fraction of 0.2-0.3 mm was used. The formed bodies were calcined to 800° C. before synthesis. Ludox LS-30 (0.19 g) was added to the calcined formed bodies (2.5 g). Then TEAOH solution (0.8 g) and water (2.8 g) was added. The synthesis mixture was reacted at 210° C. for 20 h in the autoclave. Scanning electron microscopy (SEM) was performed on the formed bodies before (K01-179.001) and after the SAPO-34 synthesis (ABA-194). The SEM pictures in FIG. 3 show that the shape and size of the formed bodies are preserved during the synthesis. The figures also show that cubic SAPO-34 crystallites are formed inside the formed bodies.

TABLE 2

Synthesis of SAPO-34 from formed bodies (spraydried materials) of AlPO/Ca-phosphate/$SiO_2$ (Table 1)

| Example | Formed body id | $SiO_2$ wt(%) in formed body | Calc. Temp (° C.)[1] | Synthesis no. | Synthesis mixture (g)[2] | | | Synthesis mixture (mmol) | | | TEAOH/ Si[3] mol/mol | SAPO-34 present, XRD |
|---|---|---|---|---|---|---|---|---|---|---|---|---|
| | | | | | Formed body | Ludox (30%) | TEAOH (35%) | $H_2O$ | Al | $SiO_2$ | TEAOH | | |
| Ex 1 | K01-178.001 | — | 400 | ABA-179-2 | 2.50 | 0.14 | 0.57 | 3.00 | 3.07 | 0.68 | 1.37 | 2 | yes |
| Ex 2 | K01-178.001 | — | 400 | ABA-187 | 3.00 | 0.16 | 0.69 | 3.00 | 3.69 | 0.82 | 1.64 | 2 | n.a.[5] |
| Ex 3 | K01-178.001 | — | 800 | ABA-191 | 3.00 | 0.16 | 0.69 | 3.00 | 3.69 | 0.82 | 1.64 | 2 | yes |

TABLE 2-continued

Synthesis of SAPO-34 from formed bodies (spraydried materials) of AlPO/Ca-phosphate/SiO$_2$ (Table 1)

| Example | Formed body id | SiO$_2$ wt(%) in formed body | Calc. Temp (° C.)[1] | Synthesis no. | Synthesis mixture (g)[2] | | | | Synthesis mixture (mmol) | | | TEAOH/ Si[3] mol/mol | SAPO-34 present, XRD |
|---|---|---|---|---|---|---|---|---|---|---|---|---|---|
| | | | | | Formed body | Ludox (30%) | TEAOH (35%) | H$_2$O | Al | SiO$_2$ | TEAOH | | |
| Ex 4  | K01-179.001 | —  | 400 | ABA-180-1 | 1.25 | 0.14 | 0.57 | 1.10 | 2.87 | 0.68 | 1.37 | 2 | yes |
| Ex 5  | K01-179.001 | —  | 400 | ABA-180-2 | 1.25 | 0.14 | 1.15 | —    | 2.87 | 0.68 | 2.73 | 4 | yes |
| Ex 6  | K01-179.001 | —  | 600 | ABA-185-1 | 1.25 | 0.14 | 0.57 | 1.10 | 2.87 | 0.68 | 1.37 | 2 | yes |
| Ex 7  | K01-179.001 | —  | 600 | ABA-188-1 | 2.50 | 0.27 | 1.15 | 2.20 | 5.74 | 1.37 | 2.73 | 2 | n.a.[5] |
| Ex 8  | K01-179.001 | —  | 800 | ABA-185-2 | 1.25 | 0.14 | 0.57 | 1.10 | 2.87 | 0.68 | 1.37 | 2 | yes |
| Ex 9  | K01-179.001 | —  | 800 | ABA-188-2 | 2.50 | 0.27 | 1.15 | 2.20 | 5.74 | 1.37 | 2.73 | 2 | yes |
| Ex 10 | K01-180.001 | 20 | 400 | ABA-181   | 1.56 |      | 2.19 | —    | 3.20 | 5.21 | 5.21 | 1 | yes |
| Ex 11 | K01-180.001 | 20 | 400 | ABA-190   | 2.50 |      | 3.50 | —    | 5.12 | 8.33 | 8.33 | 1 | n.a.[5] |
| Ex 12 | K01-181.001 | 14 | 400 | ABA-182   | 1.47 |      | 1.44 | 0.80 | 2.89 | 3.43 | 3.43 | 1 | n.d.[4] |
| Ex 13 | K01-181.001 | 14 | 600 | ABA-186-1 | 1.47 |      | 1.44 | 0.80 | 2.89 | 3.43 | 3.43 | 1 | yes |
| Ex 14 | K01-181.001 | 14 | 600 | ABA-189-1 | 2.50 |      | 2.45 | 1.40 | 4.92 | 5.83 | 5.83 | 1 | n.a.[5] |
| Ex 15 | K01-181.001 | 14 | 800 | ABA-186-2 | 1.47 |      | 1.44 | 0.80 | 2.89 | 3.43 | 3.43 | 1 | yes |
| Ex 16 | K01-181.001 | 14 | 800 | ABA-189-2 | 2.50 |      | 2.45 | 1.40 | 4.92 | 5.83 | 5.83 | 1 | n.a.[5] |

[1] Calcination temperature of the formed body
[2] synthesis mixture = formed body + liquid reaction mixture
[3] The TEAOH/Si ratio is based on the amount of Si added as Ludox
[4] n.d. = not detected
[5] n.a. = not analysed, reproduction of previous exsamples Examples 18-19

Catalytic Testing of Formed Bodies After SAPO-34 Synthesis

The catalytic properties in the Methanol-To-Olefins (MTO) reaction of selected products described in Examples 1-16 were measured. The selected products were calcined in air for 5 hours at 550° C. before testing. The products were tested at the following conditions:

One gram was placed in a reactor of quartz. The reactor was heated to 400° C. in N$_2$ and kept at this temperature for 30 min before the temperature was increased to 420° C. Then a gaseous mixture of 40 vol % methanol and 60 vol % nitrogen was passed through the reactor at a WHSV=1 g MeOH/g cat, h. The reference catalyst (ABA-132, 0.3 g) was mixed with quartz (0.7 g) and tested at identical conditions. The reactor effluent was analysed by gas chromatography. The catalyst lifetimes were defined as the time on stream for breakthrough of dimethyl-ether (t-DME), defined as the time on stream when the Carbon selectivity to dimethyl-ether (DME) in the effluent equalled 1%. The t-DME and the olefin selectivities from normalised gas phase composition at t-DME are presented in Table 3.

The fraction of SAPO in the calcined product used as catalyst was determined by adsorption of water. A sample of the calcined product was exposed to air at ambient temperature and 30-50% relative humidity for 24 hours, followed by drying to 110° C. for 2 h. The weight loss was used to determine the micropore volume. The liquid density of water of 1 g/ml was used in the calculation. The SAPO fraction was taken as the ratio between the weight loss of the product and the weight loss of the same amount of the reference catalyst (ABA-132). This is in our experience a good measure of the micropore volume connected with the microporous SAPO content.

The catalyst lifetime and $C_2^=+C_3^=$ selectivities of Example 18 (ABA-190) and Example 19 (ABA-189-2) in Table 3 correspond well with the reference SAPO-34 (ABA-132), verifying that the main part of the AlPO has been converted to active SAPO-34.

TABLE 3

Catalytic properties in the MTO reaction of SAPO-34 crystallised in formed bodies (spraydried materials) compared with the reference SAPO-34 (ABA-132). 1 g sample is used. Reaction conditions given in the text.

| Example | Catalyst | SAPO-34 (wt %) | Calc. temp of formed body (° C.) | Test no | t-DME (min) | $C_2^= + C_3^=$ Sel at t-DME (C %) |
|---|---|---|---|---|---|---|
| Ex 18 | Example 11 in Table 2 | 32[1] | 400 | MTO-870 | 160 | 79.1 |
| Ex 19 | Example 16 in Table 2 | 29[1] | 800 | MTO-869 | 175 | 78.0 |
|       | Reference ABA-132     | 30[2] |     | MTO-867 | 165 | 81.1 |

[1] Amount of SAPO estimated by water adsorption
[2] Physical mixture of reference catalyst (ABA-132) with quartz

Examples 20-21

Catalytic Testing of Formed Bodies After SAPO-34 Synthesis Without Washing

SAPO-34 synthesis was performed on the formed body K01-181.001 (spraydried, Table 1). Before SAPO synthesis the formed bodies were calcined at 400 and 800° C., respectively. 2.5 g of the formed bodies were used together with 2.45 g TEAOH-solution and 1.40 g $H_2O$. The synthesis procedure is as described in Examples 1-16. The samples were characterised with XRD after the synthesis (FIG. 4). The samples were not washed after synthesis, but only dried at 100° C. and calcined at 550° C. for 5 h before catalytic testing. The samples were tested for the MTO reaction according to the procedure described in Examples 18-19. The olefin selectivities are compared with those measured on the washed samples in Table 4. The results show that there is no need of washing of the product and there is no need of adding Ludox when Si is a part of the formed body. In addition there is no effect of calcination temperature of the spray-dried materials before synthesis on the catalytic properties.

TABLE 4

In situ synthesis of SAPO-34 in formed body containing Si (K01-181.001) with and without washing after synthesis and the catalytic properties of the samples in the MTO reaction. Reaction conditions as in Examples 18-19

| Example | Washing after synthesis | Calcination Temp. (° C.) | $C_2^= + C_3^=$ Sel at t-DME (C %) |
|---|---|---|---|
| Ex 18 | yes | 400 | 79.1 |
| Ex 19 | yes | 800 | 78.0 |
| Ex 20 | no | 400 | 76.4 |
| Ex 21 | no | 800 | 76.7 |

Examples 22-25

In-situ Synthesis of SAPO-34 from Formed Bodies Adding Less Organic Structure Directing Agent SAPO-34 synthesis was performed on the formed body K01-180.001 (spraydried, Table 1). The syntheses were performed without extra addition of Si (Ludox), otherwise according to the procedure described in Examples 1-16. However, a TEAOH/Si ratio lower than 1 was used. The synthesis mixtures are shown in Table 5 and the XRD of the samples after synthesis are shown in FIG. 5. The results show that when Si is a part of the formed body, SAPO-34 is obtained even with ratios as small as TEAOH/Si=0.09 and TEAOH/Al=0.146.

TABLE 5

Syntheses of SAPO-34 in formed body with different amounts of TEAOH

| | | Synthesis mixture (g) | | | | |
|---|---|---|---|---|---|---|
| Example | Synthesis No | Formed body | TEAOH solution | $H_2O$ | TEAOH/Al (mol/mol) | TEAOH/Si (mol/mol) |
| Ex 22 | ABA-192-2 | 2.5 | 0.32 | 2.5 | 0.146 | 0.090 |
| Ex 23 | ABA-192-3 | 2.5 | 0.88 | 2.0 | 0.406 | 0.25 |
| Ex 24 | ABA-192-4 | 2.5 | 1.72 | 1.0 | 0.797 | 0.49 |
| Ex 25 | ABA 181 | 1.56 | 2.18 | 0 | 1.625 | 1 |

Examples 26-28

In-situ Synthesis of SAPO-34 from Formed Bodies with Alternative Binders

Cylindrical formed bodies (containing about 20-40% AlPO) with a diameter of 1 mm were prepared by extrusion from a paste mixture of binder and AlPO. The water content of the paste was adjusted to obtain a suitable paste for extrusion. Three different binders were used; γ-$Al_2O_3$ (Condea NWa-160), $Al_2O_3$-sol (AlO(OH) sol, 20 nm particle size, 0.5 mol/l, made by controlled hydrolysis of Al butoxide) and kaolin (Merck 24.926.295). The formed bodies were calcined to 800° C. Thereafter the formed bodies were exposed to SAPO-34 synthesis conditions according to the procedure described in Examples 1-16. Details of the synthesis mixture composition are given in Table 6. XRD of the formed bodies after synthesis are given in FIG. 6 showing that in-situ synthesis of SAPO-34 in the formed bodies has been obtained.

TABLE 6

Preparation of the formed bodies (extrudates) with alternative binders

| | | | Synthesis mixture (g) | | | |
|---|---|---|---|---|---|---|
| Sample | Synthesis no | Binder | Formed body | Ludox | TEAOH solution | $H_2O$ |
| Ex 26 | ABA-178 | Kaolin | 1.7 | 0.095 | 0.4 | 1.5 |
| Ex 27 | ABA-183 | γ-$Al_2O_3$ | 1.6 | 0.09 | 0.376 | 1.5 |
| Ex 28 | ABA-184 | $Al_2O_3$-sol | 1.0 | 0.056 | 0.235 | 0.88 |

Examples 29-31

Binders which are Inert Under SAPO-34 Synthesis Conditions

The objective of these examples is to show that selected materials are suitable as inert binders in the formed body and do not influence the SAPO-34 synthesis. $Ca_3(PO_4)_2$ (Merck p.a.), $ZrO_2$ (Fluka pract.) and $Al_2O_3$ (Merck, aktiv neutral) have been evaluated as possible binders.

First, a reference sample was prepared where SAPO-34 was synthesised from AlPO, following the procedure given in Examples 1-16. This sample was physically mixed with $Ca_3(PO_4)_2$ and is identified as ABA-148-2. Details are given in Table 7.

Secondly, a physical mixture of AlPO and a binder (50 wt % of each) was made to which was added Ludox LS-30. Then TEAOH and water was added under thorough mixing. The mixture was reacted in the autoclave at 210° C. for 20 h.

Details of the syntheses are listed in Table 7. FIG. 7 (top) shows the XRD pattern of Example 29 (ABA-149) which is a crystalline material obtained in a SAPO-34 synthesis from AlPO in the presence of $Ca_3(PO_4)_2$. For comparison, the XRD pattern of the reference ABA-148-2; the physical mixture of SAPO-34 and $Ca_3(PO_4)_2$, is displayed on the same FIG. 7 (middle). The difference between the two diffractograms is also displayed in FIG. 7. The results show that the presence of $Ca_3(PO_4)_2$ in the hydrothermal synthesis does not influence the SAPO-34 formation. Similar results were obtained for $ZrO_2$ and $Al_2O_3$. No change in the XRD diffractogram was observed when the binders alone were exposed to the synthesis conditions.

The examples confirm that all these materials are suitable as inert binders in the formed bodies containing AlPO in which SAPO-34 can be synthesised.

TABLE 7

SAPO-34 synthesis from a physial mixture of AlPO and binder (50:50 by weight)

| Example | Synthesis no | AlPO | H₂O | TEAOH solution | Ludox | Si mol/mol | Si/Al mol/mol | Binder |
|---|---|---|---|---|---|---|---|---|
| Ex 29 | ABA-149 | 1 | 0.7 | 1.15 | 0.28 | 2 | 0.17 | $Ca_3(PO_4)_2$ |
| Ex 30 | ABA-156 | 1 | 0.7 | 1.15 | 0.28 | 2 | 0.17 | $Al_2O_3$ |
| Ex 31 | ABA-153 | 1 | 0.7 | 1.15 | 0.28 | 2 | 0.17 | $ZrO_2$ |
| Reference | ABA-148-2 | 2 | | 2.3 | 0.55 | 2 | 0.17 | $Ca_3(PO_4)_2$, mixed after SAPO-34 synthesis |

Examples 32-35

Catalytic Properties in MTO of SAPO-34 in the Presence of Inert Binder

The objective of these examples is to verify that the binder materials have no influence on the MTO reaction. Catalytic testing was performed on the reference sample ABA-148-2 (Table 7) which is a physical mixture of SAPO-34 and $Ca_3(PO_4)_2$, as well as the materials where SAPO-34 was synthesised from AlPO in the presence of $Ca_3(PO_4)_2$, $ZrO_2$ or $Al_2O_3$, as described in Examples 29-31. One gram of each mixture was tested at the conditions described in Examples 18-19. The results are summarised in Table 8, listing t-DME and olefin selectivity at t-DME, respectively. The results confirm that $Ca_3(PO_4)_2$, $ZrO_2$ or $Al_2O_3$ do not significantly influence the SAPO-34 synthesis and has no significant effect on the MTO reaction.

TABLE 8

Catalytic properties in the MTO reaction of SAPO-34 mixed with binder (Examples 29-31 and reference in Table 7). 1 g sample. Reaction conditions as in Examples 18-19

| Example | Catalyst | Synthesis no | Test | t-DME | $C_2^= + C_3^=$ Sel at t-DME (C %) |
|---|---|---|---|---|---|
| Ex 32 | Reference in Table 7 | ABA-148-2 | MTO-843 | 390 | 79.5 |
| Ex 33 | Ex 29 in Table 7 | ABA-149 | MTO-839 | 370 | 78.4 |
| Ex 34 | Ex 30 in Table 7 | ABA-156 | MTO-851 | 310 | 81.4 |
| Ex 35 | Ex 31 in Table 7 | ABA-153 | MTO-852 | 310 | 83.9 |

Example 36

Synthesis of CoAPO-5 in the Presence of a Binder

To 2.5 g of AlPO (synthesised according to the method given in U.S. Pat. No. 4,364,855, P/Al=1), 0.465 g Co(NO$_3$)$_2$*6H$_2$O (Janssen Chimical 21.921.96) in 3.4 g H$_2$O was added, and the water was removed at 110° C. overnight. Thereafter 46 mg H$_3$PO$_4$ (Merck p.a. 85%) in 3.4 g H$_2$O was added and the material was dried overnight at 110° C. The material was then washed with 1000 g H$_2$O and dried again overnight at 110° C. Then 2.0 g Ca$_3$(PO$_4$)$_2$ (Merck p.a.) and 1.417 g triethylamine (Janssen 15.791.77) in 2.5 g H$_2$O was added to this material in a Teflon lined autoclave and placed in an oven at 210° C. for 20 h. After cooling to room temperature the material was washed twice with 200 g water and dried overnight at 110° C. The final product had a blue colour.

XRD of this material showed the predominant crystallisation of CoAPO-5 material (AFI structure).

This example shows that it is possible to prepare microporous materials with structures different from CHA and which contains other EL than Si, in the presence of calcium phosphate as a binder.

The invention claimed is:

1. Method for production of formed bodies containing crystalline microporous metalloaluminophosphate (ELAPO), which comprises preparing a formed body from a mixture of an inert binder and a solid material containing Al and P, adding a liquid reaction mixture comprising an active source of an EL metal, an organic structure directing agent and water to the formed body, and performing in-situ crystallisation in said formed body at elevated temperature under autogenous pressure to form crystals of microporous ELAPO inside said body.

2. Method according to claim 1, wherein the EL metal is selected from the group consisting of silicon, magnesium, zinc, iron, cobalt, nickel, manganese, chromium, titanium and mixtures thereof.

3. Method according to claim 1, wherein the EL metal is silicon and crystalline microporous SAPO is synthesised inside said formed body.

4. Method according to claim 1, wherein the crystallisation is performed at temperatures from 100-260° C.

5. Method according to claim 4, wherein the temperature is 200-220° C.

6. Method according to claim 1, wherein the hydrothermal reaction time is 1-120 hours.

7. Method according to claim 6, wherein the reaction time is 2-20 hours.

8. Method according to claim 1, wherein the formed body is calcined prior to the addition of the liquid reaction mixture.

9. Method according to claim 1, wherein the organic structure directing agent is selected from the group consisting of tetraethyl ammonium hydroxide (TEAOH), triethylamine (TPA), isopropylamine (IPA), di-isopropylamine (DPA), tripropylamine (TPA), cyclohexylamine, tetramethyl-ammonium-hydroxide (TMAOH) and mixtures thereof.

10. A catalyst comprising the formed bodies containing crystalline microporous metalloaluminophosphate (ELAPO) produced according to the method in claim 1.

11. An adsorbent comprising the formed bodies containing crystalline microporous metalloaluminophosphate (ELAPO) produced according to the method in claim 1.

12. A method for the production of olefins from an oxygenate containing feedstock comprising at least one compound selected from the group consisting of methanol, ethanol, n-propanol, iso-propanol, C4-C20 alcohols, methyl ethyl ether, dimethyl ether, diethyl ether, di-isopropyl ether, formaldehyde, dimethyl carbonate, dimethyl ketone, acetic acid and mixtures thereof, which comprises heating the feedstock in the presence of the formed bodies containing crystalline microporous metalloaluminophosphate (ELAPO) produced according to the method in claim 1 as catalyst.

13. Method according to claim 1, wherein the formed bodies contain at least 54% by weight of the inert binder.

14. Method according to claim 1, wherein the formed bodies contain 54-83% by weight of the inert binder.

15. Method for production of formed bodies containing crystalline microporous metalloaluminophosphate (ELAPO), which comprises preparing a formed body from a mixture of an inert binder and a solid material containing EL metal, Al and P, adding a liquid reaction mixture comprising an organic structure directing agent and water to the formed body, and performing in-situ crystallisation in said formed body at elevated temperature under autogenous pressure to form crystals of microporous ELAPO inside said body.

16. Method according to claim 15, wherein the solid material is an EL aluminium phosphate.

17. Method according to claim 15, wherein the EL metal is selected from the group consisting of silicon, magnesium, zinc, iron, cobalt, nickel, manganese, chromium, titanium and mixtures thereof.

18. Method according to claim 15, wherein the EL metal is silicon and crystalline microporous SAPO is synthesised inside said formed body.

19. Method according to claim 15, wherein the crystallisation is performed at temperatures from 100-260° C.

20. Method according to claim 19, wherein the temperature is 200-220° C.

21. Method according to claim 15, wherein the hydrothermal reaction time is 1-120 hours.

22. Method according to claim 21, wherein the reaction time is 2-20 hours.

23. Method according to claim 15, wherein the formed body is calcined prior to the addition of the liquid reaction mixture.

24. Method according to claim 15, wherein the organic structure directing agent is selected from the group consisting of tetraethyl ammonium hydroxide (TEAOH), triethylamine (TPA), isopropylamine (IPA), di-isopropylamine (DPA), tripropylamine (TPA), cyclohexylamine, tetramethyl-ammonium-hydroxide (TMAOH) and mixtures thereof.

25. A catalyst comprising the formed bodies containing crystalline microporous metalloaluminophosphate (ELAPO) produced according to the method in claim 15.

26. An adsorbent comprising the formed bodies containing crystalline microporous metalloaluminophosphate (ELAPO) produced according to the method in claim 15.

27. A method for the production of olefins from an oxygenate containing feedstock comprising at least one compound selected from the group consisting of methanol, ethanol, n-propanol, iso-propanol, C4-C20 alcohols, methyl ethyl ether, dimethyl ether, diethyl ether, di-isopropyl ether, formaldehyde, dimethyl carbonate, dimethyl ketone, acetic acid and mixtures thereof, which comprises heating the feedstock in the presence of the formed bodies containing crystalline microporous metalloaluminophosphate (ELAPO) produced according to the method in claim 15 as catalyst.

28. Method according to claim 15, wherein the formed bodies contain at least 54% by weight of the inert binder.

29. Method according to claim 15, wherein the formed bodies contain 54-83% by weight of the inert binder.

30. Method according to claim 15, wherein the liquid reaction mixture also contains an active source of a metal EL.

31. Method according to claim 30, wherein the EL metal is selected from the group consisting of silicon, magnesium, zinc, iron, cobalt, nickel, manganese, chromium, titanium and mixtures thereof.

32. Method according to claim 30, wherein the EL metal is silicon and crystalline microporous SAPO is synthesised inside said formed body.

33. Method according to claim 30, wherein the solid material is an EL aluminium phosphate.

34. Method according to claim 30, wherein the crystallisation is performed at temperatures from 100-260° C.

35. Method according to claim 34, wherein the temperature is 200-220° C.

36. Method according to claim 30, wherein the hydrothermal reaction time is 1-120 hours.

37. Method according to claim 36, wherein the reaction time is 2-20 hours.

38. Method according to claim 30, wherein the formed body is calcined prior to the addition of the liquid reaction mixture.

39. Method according to claim 30, wherein the organic structure directing agent is selected from the group consisting of tetraethyl ammonium hydroxide (TEAOH), triethylamine (TPA), isopropylamine (IPA), di-isopropylamine (DPA), tripropylamine (TPA), cyclohexylamine, tetramethyl-ammonium-hydroxide (TMAOH) and mixtures thereof.

* * * * *